Oct. 7, 1969   F. G. BACK   3,471,213
LONG RANGE VARIFOCAL OPTICAL SYSTEMS
Filed Jan. 28, 1965

INVENTOR
FRANK G. BACK
BY Albert F. Kronman
ATTORNEY

United States Patent Office 3,471,213
Patented Oct. 7, 1969

3,471,213
LONG RANGE VARIFOCAL OPTICAL SYSTEMS
Frank G. Back, 55 Sea Cliff Ave.,
Glen Cove, N.Y. 11542
Filed Jan. 28, 1965, Ser. No. 428,760
Int. Cl. G02b 27/32, 7/04, 15/00
U.S. Cl. 350—10                                  2 Claims

ABSTRACT OF THE DISCLOSURE

A long range varifocal optical device for tracking or sighting moving or fixed objects in which great pointing accuracy is achieved by employing a collimating lens to project out to infinity the image generated by the objective and the light passing through a reticle disposed between the objective and the collimator. The image so projected is then varied by the varifocal lens system portion of the device. A scale on the reticle changes in size with the target permitting the range to be read directly and precisely.

---

This invention relates to long range varifocal optical systems and particularly to varifocal optical systems useful in tracking or sighting moving or fixed objects at great distances.

Where it is desired to use varifocal lens systems as part of a sighting or tracking device, it has heretofore been found that there was great loss in pointing accuracy as the reticle normally employed for this purpose shifted with respect to the object when the focal length of the system was changed. This movement of the observed reticle resulted from the necessary play in the movable lens components of the varifocal lens system.

In order to make measurements, using a varifocal lens system for tracking and sighting purposes, it is necessary to know the exact focal length of the said lens system at the time of such measurement. Various devices have been tried for this purpose such as the use of return signals. Such previously tried systems not only proved inefficient but involved large and unwieldy apparatus.

Accordingly, it is an object of the present invention to provide a long range varifocal optical system useful for sighting and tracking distant objects which is free of the limitations of prior art devices.

Another object of the present invention is to provide a long range varifocal optical system having a reticle therein capable of great pointing accuracy despite the movement of the varifocal lens elements.

A further object of the present invention is to provide a calibrated reticle in a long range varifocal optical system, accurate enough for measurements at all times.

Still another object of the present invention is to provide a long range varifocal optical system in which measurements can be read directly without the need for complicated and cumbersome auxiliary devices.

A feature of the present invention is the use of a reticle in the image plane of an objective lens system.

A further feature of the present invention is the use of a varifocal lens system to receive the combined image of the object and the reticle.

Still another feature of the present invention is the use of a calibrated reticle whereby the equivalent focal length of the system can be read directly.

In the accompanying drawing, forming a part hereof there is illustrated one form of embodiment of the invention, in which drawing similar reference characters designate corresponding parts and in which.

Figure 1:
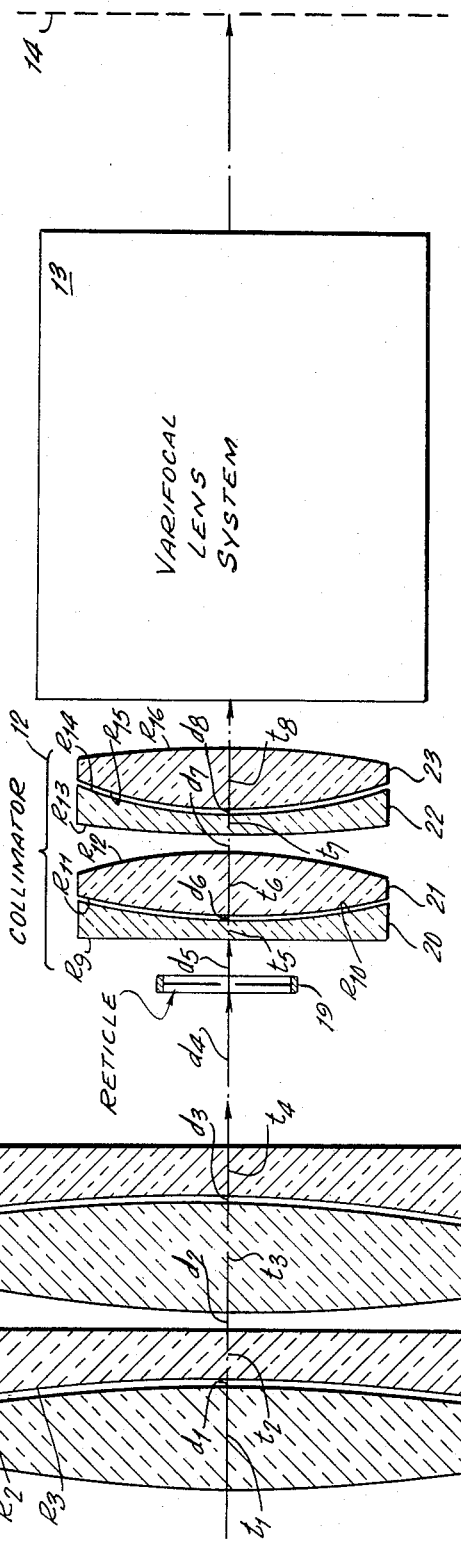
FIGURE 1 is a view in longitudinal section of a complete embodiment of the present invention.

Referring to the drawings and particularly to FIGURE 1, 10 indicates a long range varifocal lens system having an objective 11, a collimator 12 and a varifocal lens assembly 13. The objective 11 shown in this embodiment consists of a positive lens system formed of two pairs of air spaced lenses 15, 16, 17, 18.

A reticle 19, is positioned within the lens system 10, at the image plane of the objective 11. The image of the object viewed through the objective 11 and the reticle 19, are thereby superimposed. The collimator 12, which comprises a positive lens system of air spaced lenses 20, 21, 22, 23, receives the light thus transmitted and directs it into the front lens (not shown) of the varifocal lens assembly 13. The varifocal lens assembly 13 thus in effect "sees" both the object and the reticle 19.

The varifocal lens assembly indicated generally by the block 13 may comprise any mechanically or optically compensated lens system of this type, well known in the art. It is sufficient for the purpose of this invention that the varifocal lens system have the ability, in accordance with well-known varifocal lens operations, to vary the focal length of the system.

The light from the varifocal system 13 is directed onto the film plane of a photographic or television camera, indicated at 14.

It will be observed from the foregoing and the following specific example that the objective consists of two groups of air space lenses 15, 16 and 17, 18, having coinciding focal points. The two air spaced positive lens systems 20, 21 and 22, 23, forming the collimator 12 are of shorter focal length and the virtual image of the combined reticle and real image at infinity serve as the object for the varifocal lens system 13. The ratio of the focal length of the front, objective, system 11, to the focal length of the collimator system 12 is the factor by which the different focal lengths of the varifocal lens 13 have to be multiplied to get the equivalent focal length of the combination.

Figure 2:
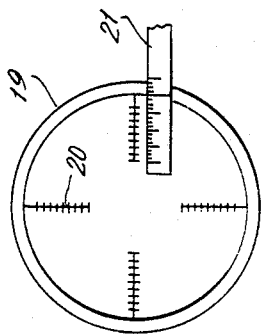
FIGURE 2 is a view in front elevation of the reticle image as it appears on the film plane of the invention.

A photographic camera or television camera (not shown) may be positioned to receive the image at the focal plane 14 of the system. The combined image will include the reticle 19 as illustrated in FIGURE 2. It will be observed from an examination of FIGURE 2 that the reticle 19 is provided with calibrations 20 which may be in mils. As the focal length of the system is changed by the operation of the varifocal lens system, the calibrations on the reticle 19 will move with the image projected on the focal plane 14. By measuring the movement of one of the calibrations 20, it is possible to read directly the position of the varifocal system in terms of its focal length at any time. Since the reticle 19 is disposed outside of the varifocal lens system 13, it changes its size proportionally to the focal length of the varifocal system. By applying a scale 21, to the calibrated reticle 19, the displacement of any one of the calibrations 20 can be measured. In the case of a photographic image the scale can be printed on the film to be viewed. In the case of a television camera the scale can be applied to the viewing screen (not shown) for the purpose of the present invention.

The optical characteristics of a preferred form of long range varifocal optical system according to the present invention is set forth in the following table:

EXAMPLE I

| Lens No. | Radii in mm. | Thickness (t) Separation (d) in mm. | Cat. Ref. | Nd | Abbe's Dispersion No. V |
|---|---|---|---|---|---|
| Objective: | | | | | |
| 15 | $R_1=163.470$ | $t_1=11.00$ | BK-7 | 1.51680 | 64.1 |
|  | $R_2=-163.470$ | $d_1=.100$ | | | |
| 16 | $R_3=-163.470$ | $t_2=4.500$ | F-2 | 1.6200 | 36.34 |
|  | $R_4=-4,165.100$ | $d_2=1.00$ | | | |
| 17 | $R_5=163.470$ | $t_3=11.00$ | BK-7 | 1.51680 | 64.19 |
|  | $R_6=-163.470$ | $d_3=.100$ | | | |
| 18 | $R_7=-163.470$ | $t_4=4.500$ | F-2 | 1.6200 | 36.34 |
|  | $R_8=-4,165.100$ | $d_4=171.590$ | | | |
| | EFL=+188.60 mm. (+5.302 Diopters) | | | | |
| Reticle | | $d_5=49.29$ | | | |
| Collimator: | | | | | |
| 20 | $R_9=403.740$ | $t_5=2.000$ | SF-12 | 1.64830 | 33.76 |
|  | $R_{10}=54.980$ | $d_6=.100$ | | | |
| 21 | $R_{11}=54.980$ | $t_6=6.000$ | BK-7 | 1.51680 | 64.19 |
|  | $R_{12}=-54.980$ | $d_7=6.20$ | | | |
| 22 | $R_{13}=403.740$ | $t_7=2.000$ | SF-12 | 1.64830 | 38.76 |
|  | $R_{14}=54.980$ | $d_8=.100$ | | | |
| 23 | $R_{15}=54.980$ | $t_8=6.000$ | BK-7 | 1.51680 | 64.19 |
|  | $R_{16}=-54.980$ | $d_9=5.000$ | | | |
| | EFL=+60.796 mm. (+16.448 Diopters) | | | | |

BK=Borosilicate Crown.
SF=Dense Flint.
F=Flint.
Nd is the index of refraction for d light.

The optical characteristics of a second preferred form of a long range varifocal optical system according to the present invention is set forth in the following table:

EXAMPLE II

| Lens No. | Radii in mm. | Thickness (t) Separation (d) in mm. | Glass Cat. Ref. | Index Nd | Abbe's Dispersion No. V |
|---|---|---|---|---|---|
| Objective: | | | | | |
| 15 | $R_1=163.470$ | $t_1=11.00$ | BK-7 | 1.51680 | 64.19 |
|  | $R_2=-163.470$ | $d_1=.100$ | | | |
| 16 | $R_3=-163.470$ | $t_2=4.500$ | F-2 | 1.6200 | 36.34 |
|  | $R_4=-4,165.100$ | $d_2=1.00$ | | | |
| 17 | $R_5=163.470$ | $t_3=11.00$ | BK-7 | 1.51680 | 64.19 |
|  | $R_6=-163.470$ | $d_3=.100$ | | | |
| 18 | $R_7=-163.470$ | $t_4=4.500$ | F-2 | 1.6200 | 36.34 |
|  | $R_8=-4,165.100$ | $d_4=171.590$ | | | |
| | EFL=+188.60 mm. (+5.302 Diopters) | | | | |
| Reticle | | $d_5=49.89$ | | | |
| Collimator: | | | | | |
| 20 | $R_9=356.990$ | $t_5=2.000$ | SF-12 | 1.64830 | 33.76 |
|  | $R_{10}=57.390$ | $d_6=2.00$ | | | |
| 21 | $R_{11}=57.390$ | $t_6=7.000$ | BK-7 | 1.51680 | 64.19 |
|  | $R_{12}=-57.390$ | $d_7=4.800$ | | | |
| 22 | $R_{13}=127.580$ | $t_7=2.000$ | SF-12 | 1.64830 | 33.76 |
|  | $R_{14}=44.510$ | $d_8=.200$ | | | |
| 23 | $R_{15}=44.510$ | $t_8=7.000$ | BK-7 | 1.51680 | 64.19 |
|  | $R_{16}=-79.960$ | $d_9=5.000$ | | | |
| | EFL=+60.805 mm. (+16.446 Diopters) | | | | |

BK=Borosilicate Crown.
SF=Dense Flint.
F=Flint.
Nd is the index of refraction for d light.

It will be apparent from the foregoing that the varifocal lens system 13 may take various forms, well known in the art, and be either of the optically compensated type, as illustrated, or mechanically compensated.

From the foregoing it will be observed that there has been provided a long range varifocal optical system particularly adapted for use as part of a sighting or tracking device which will have high pointing accuracy and also provide a ready means for determining the exact focal length of the lens system at any given time.

Having thus fully described the invention, what is claimed as new and desired to be secured by Letters Patent of the United States, is:

1. A long range varifocal lens system comprising an objective to receive light from an object, a reticle disposed in the image plane of the objective, a collimator having a focal plane coincident with the image plane of the objective to receive the light from the image generated by the objective and passing through the reticle and form a superimposed virtual image of the object and the recticle, a varifocal lens system to receive the light coming from the collimator, in which the lenses have the following optical characteristics:

| Lens No. | Radii in mm. | Thickness (t) Separation (d) in mm. | Cat. Ref. | Nd | Abbe's Dispersion No. V |
|---|---|---|---|---|---|
| Objective: | | | | | |
| 15 | $R_1 = 163.470$ | $t_1 = 11.00$ | BK-7 | 1.51680 | 64.1 |
| | $R_2 = -163.470$ | $d_1 = .100$ | | | |
| 16 | $R_3 = -163.470$ | $t_2 = 4.500$ | F-2 | 1.6200 | 36.34 |
| | $R_4 = -4,165.100$ | $d_2 = 1.00$ | | | |
| 17 | $R_5 = 163.470$ | $t_3 = 11.00$ | BK-7 | 1.51680 | 64.19 |
| | $R_6 = -163.470$ | $d_3 = .100$ | | | |
| 18 | $R_7 = -163.470$ | $t_4 = 4.500$ | F-2 | 1.6200 | 36.34 |
| | $R_8 = -4,165.100$ | $d_4 = 171.590$ | | | |
| | EFL = +188.60 mm. (+5.302 Diopters) | | | | |
| Reticle | | $d_5 = 49.29$ | | | |
| Collimator: | | | | | |
| 20 | $R_9 = 403.740$ | $t_5 = 2.000$ | SF-12 | 1.64830 | 33.76 |
| | $R_{10} = 54.980$ | $d_6 = .100$ | | | |
| 21 | $R_{11} = 54.980$ | $t_6 = 6.000$ | BK-7 | 1.51680 | 64.19 |
| | $R_{12} = -54.980$ | $d_7 = 6.20$ | | | |
| 22 | $R_{13} = 403.740$ | $t_7 = 2.000$ | SF-12 | 1.64830 | 38.76 |
| | $R_{14} = 54.980$ | $d_8 = .100$ | | | |
| 23 | $R_{15} = 54.980$ | $t_8 = 6.000$ | BK-7 | 1.51680 | 64.19 |
| | $R_{16} = -54.980$ | $d_9 = 5.000$ | | | |
| | EFL = +60.796 mm. (+16.448 Diopters) | | | | |

BK = Borosilicate Crown.
SF = Dense Flint.
F = Flint.
Nd is the index of refraction for $d$ light, and means to vary the focal length of the varifocal lens system and direct an image of the object and the reticle upon a focal plane.

2. A long range varifocal lens system comprising an objective to receive light from an object, a reticle disposed in the image plane of the objective, a collimator having a focal plane coincident with the image plane of the objective to receive the light from the image generated by the objective and passing through the reticle and form a superimposed virtual image of the object and the reticle, a varifocal lens system to receive the light coming from the collimator, in which the lenses have the following optical characteristics:

| Lens No. | Radii in mm. | Thickness (t) Separation (d) in mm. | Glass Cat. Ref. | Index Nd | Abbe's Dispersion No. V |
|---|---|---|---|---|---|
| Objective: | | | | | |
| 15 | $R_1$=163.470 | $t_1$=11.00 | BK-7 | 1.51680 | 64.19 |
|    | $R_2$=−163.470 | $d_1$=.100 | | | |
| 16 | $R_3$=−163.470 | $t_2$=4.500 | F-2 | 1.6200 | 36.34 |
|    | $R_4$=−4,165.100 | $d_2$=1.00 | | | |
| 17 | $R_5$=163.470 | $t_3$=11.00 | BK-7 | 1.51680 | 64.19 |
|    | $R_6$=−163.470 | $d_3$=.100 | | | |
| 18 | $R_7$=−163.470 | $t_4$=4.500 | F-2 | 1.6200 | 36.34 |
|    | $R_8$=−4,165.100 | $d_4$=171.590 | | | |
| | EFL=+188.60 mm. (+5.302 Diopters) | | | | |
| Reticle | | $d_5$=49.89 | | | |
| Collimator: | | | | | |
| 20 | $R_9$=356.990 | $t_5$=2.000 | SF-12 | 1.64830 | 33.76 |
|    | $R_{10}$=57.390 | $d_6$=2.00 | | | |
| 21 | $R_{11}$=57.390 | $t_6$=7.000 | BK-7 | 1.51680 | 64.19 |
|    | $R_{12}$=−57.390 | $d_7$=4.800 | | | |
| 22 | $R_{13}$=127.580 | $t_7$=2.000 | SF-12 | 1.64830 | 33.76 |
|    | $R_{14}$=44.510 | $d_8$=.200 | | | |
| 23 | $R_{15}$=44.510 | $t_8$=7.000 | BK-7 | 1.51680 | 64.19 |
|    | $R_{16}$=−79.960 | $d_9$=5.000 | | | |
| | EFL=+60.805 mm. (+16.446 Diopters) | | | | |

BK=Borosilicate Crown.
SF=Dense Flint.
F=Flint.
Nd is the index of refraction for d light, and means to vary the focal length of the varifocal lens system and direct an image of the object and the reticle upon a focal plane.

References Cited

UNITED STATES PATENTS 3,386,330  6/1968  Burrig et al. _____ 350—10 X

DAVID SCHONBERG, Primary Examiner

T. H. KUSMER, Assistant Examiner

U.S. Cl. X.R.

350—40, 220; 33—50.5